US006446108B1

(12) United States Patent
Rosenberg et al.

(10) Patent No.: US 6,446,108 B1
(45) Date of Patent: Sep. 3, 2002

(54) METHOD FOR WIDE AREA NETWORK SERVICE LOCATION

(75) Inventors: Jonathan D. Rosenberg, Morganville; Henning G. Schulzrinne, Leonia; Bernhard Suter, Aberdeen, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/064,581

(22) Filed: Apr. 22, 1998

Related U.S. Application Data

(60) Provisional application No. 60/053,026, filed on Jul. 18, 1997.

(51) Int. Cl.[7] .............................................. G06F 15/16
(52) U.S. Cl. ..................... 709/203; 709/202; 709/217; 709/219; 709/231; 709/233; 709/238; 709/245
(58) Field of Search ........................ 705/37, 14, 26–27; 709/200–203, 217–219, 227–229, 105–107, 231–233, 236–239, 245; 714/1; 707/1, 3, 9–10; 713/200–201

(56) References Cited

U.S. PATENT DOCUMENTS

| 5,227,778 A |   | 7/1993  | Visser           |         |
|-------------|---|---------|------------------|---------|
| 5,329,619 A | * | 7/1994  | Page et al.      | 709/203 |
| 5,475,819 A | * | 12/1995 | Miller et al.    | 709/203 |
| 5,603,029 A | * | 2/1997  | Aman et al.      | 709/105 |
| 5,608,865 A | * | 3/1997  | Midgely et al.   | 714/1   |
| 5,621,734 A | * | 4/1997  | Mann et al.      | 709/227 |
| 5,740,549 A | * | 4/1998  | Reilly et al.    | 705/14  |
| 5,742,598 A | * | 4/1998  | Dunn et al.      | 370/393 |
| 5,815,665 A | * | 9/1998  | Teper et al.     | 709/229 |
| 5,826,244 A | * | 10/1998 | Huberman         | 705/37  |

(List continued on next page.)

FOREIGN PATENT DOCUMENTS

EP    0 491 069 A    6/1992

OTHER PUBLICATIONS

Microsoft Press Computer Dictionary, Third Edition, 1997, pp. 64 and 318.*

Schwartz, M F : "Internet Resource Discovery at the University of Colorado" Computer, IEEE Computer Society, Sep. 1, 1993.

Peterson L L: "A yellow–pages service for a local–area network" Computer Communications Review, Asso. for Computing Machinery, Aug. 1, 1988.

A. Gulbradsen, P. Vixie, "A DNS RR for Specifying the Location of Services (DNS SRV)," IETF Request for Comments 2052, Oct. 1996.

R. Moats, M. Hamilton, P. Leach, "Finding Stuff", IETF InternetDraft draft–ietf–srvloc–discovery–02.txt, Work in Progress. (No date).

C. Malamud, M. Rose, "Principles of Operation for TPC.INT Subdomain: General Principles and Policy", IETF Request for Comments 1530, Oct. 1993.

The Service Location Protocol see for example, J. Veizades, E. Guttman, C. Perkins, S. Kaplan, "Service Location Protocol", IETF Request for Comments, 2165, Jun. 1997.

Session Announcement Protocol (SAP), M. Handley, "SAP—Session Announcement Protocol", IETF Internet Draft, Work in Progress (No Date).

*Primary Examiner*—Bharat Barot
(74) *Attorney, Agent, or Firm*—Lieberman & Nowak, LLP

(57) ABSTRACT

A method for a client to locate a particular service from a service provider on wide area computer networks. The method includes multicasting of an advertisement from a service provider, which advertisement is detected by a Service Broker and in turn multicast into the wide area computer network. A client queries the network when seeking a particular service and receives in turn the address of the Broker and a Server to obtain the service desired.

10 Claims, 2 Drawing Sheets

U.S. PATENT DOCUMENTS

| | | | | |
|---|---|---|---|---|
| 5,905,865 A | * | 5/1999 | Palmer et al. | 709/217 |
| 5,905,871 A | * | 5/1999 | Buskens et al. | 709/245 |
| 5,948,054 A | * | 9/1999 | Nielsen | 709/200 |
| 5,974,409 A | * | 10/1999 | Sanu et al. | 707/3 |
| 6,018,771 A | * | 1/2000 | Hayden | 709/231 |
| 6,041,166 A | * | 3/2000 | Hart et al. | 709/238 |
| 6,157,944 A | * | 12/2000 | Pedersen | 709/227 |
| 6,230,205 B1 | * | 5/2001 | Garrity et al. | 709/231 |
| 6,279,112 B1 | * | 8/2001 | O'Toole, Jr. et al. | 705/14 |
| 6,338,081 B1 | * | 1/2002 | Furusawa et al. | 709/20 |

* cited by examiner

METHOD FOR WIDE AREA NETWORK SERVICE LOCATION

CROSS-REFERENCE TO PROVISIONAL APPLICATION

This application claims the benefit of U.S. Provisional Application No. 60/053,026, filed Jul. 18, 1997.

FIELD OF THE INVENTION

The instant invention relates to the general problem of service location in wide area computer networks and, more particularly, to the specific problem which arises when a user wishes to locate some service, such as a media bridge, internet telephony gateway, H.323 Gatekeeper, unicast to multicast bridge, etc., which has some desired characteristics, but whose location (in terms of network address, domain or geographical location) is completely unknown and may be anywhere on the public network.

BACKGROUND OF THE INVENTION

Today, there exists a number of examples of wide area services. One is media bridges, which are devices used for mixing voice or video together for multipoint conferences. Another might be a media server, which contains movies and multimedia accessible to the user for playback. Another example are Internet telephone gateways. These devices allow Internet hosts to communicate with standard "POTS" telephone users by translating Internet telephony to traditional telephony. Yet another example is a multicast to unicast bridge, which would allow unicast-only endpoints to receive multicast.

Generally, with currently existing technology, service location mechanisms need to be involved for every call set-up. This makes their location a time critical, and potentially network and CPU intensive operation. Furthermore, relaying internet telephony calls to the PSTN results in cost for the gateway provider which must somehow be passed on to the remote user. This also requires security mechanisms to provide authentification and authenticity in an international environment.

Prior art systems and devices exist for locating services, but none work well for wide area network service location. For example, some prior art publications have taught the use of DNS records for finding services in a particular domain. See for example A. Gulbrandsen, P. Vixie, "A DNS RR for Specifying the Location of Services (DNS SR V)", IETF Request for Comments 2052, October 1996, and R. Moats, M. Hamilton, P. Leach, "Finding Stuff", IETF InternetDraft draft-ietf-srvloc-discovery-02.txt, Work in progress. Prior art publications have also addressed the problem of finding fax gateways in a particular telephone exchange; see, for example, C. Malamud, M. Rose, "Principles of Operation for TPC.INT Subdomain: General Principles and Policy", IETF Request for Comments 1530, October 1993.

The use of DNS requires the client to know the domain name where the server is located, which is generally not possible. The Service Location Protocol, see for example, J. Veizades, E. Guttman, C. Perkins, S. Kaplan, "Service Location Protocol", IETF Request for Comments 2165, June 1997, is used for location of services in an administrative domain, but does not work for wide area networks as it ends up using excessive bandwidth as more servers and clients use it. The Session Announcement Protocol (SAP), M. Handley, "SAP - Session Announcement Protocol", EETF Internet Draft, Work in Progress, allows for announcement of services, but requires an excessive amount of time for clients to learn about them. Web search engines, such as Lycos and Alta Vista, can also be used for the location of services. However, such search engines tend to generate excessive traffic, and service location control rests in the hands of a few, dedicated search facilities. This has limited scalability.

It is, therefore, an object of the instant invention to provide a solution to the service location problem which is efficient and scalable both in use of bandwidth and CPU power.

It is a further object of the instant invention to provide a protocol architecture which allows clients in a data network to readily locate services in a wide area network.

It is another object of the instant invention to provide a protocol architecture which scales to an infinite number of clients and millions of servers without requiring excessive bandwidths, while at the same time being fast, simple and flexible.

SUMMARY OF THE INVENTION

The claimed invention comprises a protocol architecture which allows clients connected to a data network to locate services in a wide area network such as the internet. The invention scales to an infinite number of clients and millions of servers without requiring excessive bandwidths and is also fast, simple and flexible.

The inventive method includes activating a server X to provide a service A to clients and when activated server X multicasts an advertisement for service A to a multicast group $G_1$.

Broker Y stores the advertisement for service A in its database and multicast the advertisement for service A to a multicast group $G_2$, which advertisement is detected by Directory Agent Z and stored in Z's data base.

A client, looking to find a server for service A queries Directory Agent Z and receives the address for Broker Y, who then provides to the client the address for server X.

The client is then able to contact server X to obtain service A.

BRIEF DESCRIPTION OF DRAWINGS

This invention is pointed out with particularity in the appended claims. The above and further advantages of this invention may be better understood by referring to the following description taken in conjunction with the accompanying drawings in which:

DETAILED DESCRIPTION OF THE INVENTION

We formally define the wide area service location problem as follows. A client on a computer network (IP based, ATM, etc.) wishes to find a server that provides a service. There are no restrictions on the name space, network address space, geographical location, or administrative domain where the server may be located. Furthermore, the client has no knowledge of the location of the server. It has only a definition of specific attributes or constraints (e.g., supported protocols, type of billing used, cost) which are desirable or metrics to minimize or maximize (e.g., cost, quality, distance). A protocol is needed to allow the client to find the server. The requirements for such a protocol are:

1. Scalable: The protocol should work for many clients and servers, without using excessive network bandwidth, and without requiring too much time to locate the service.

2. Allow for costs: Network servers may charge for their services. The protocol should allow a client to choose a server based on cost minimization.

3. Allow for distance: A client may require a server to be close to it, in order to minimize network delays. It should be possible to locate a server based on its proximity to the client.

4. Support authentification: A client my want to know that a server is really trustworthy. Mechanisms must exist for authenticating and verifying the services provided by a server.

Figure 1:
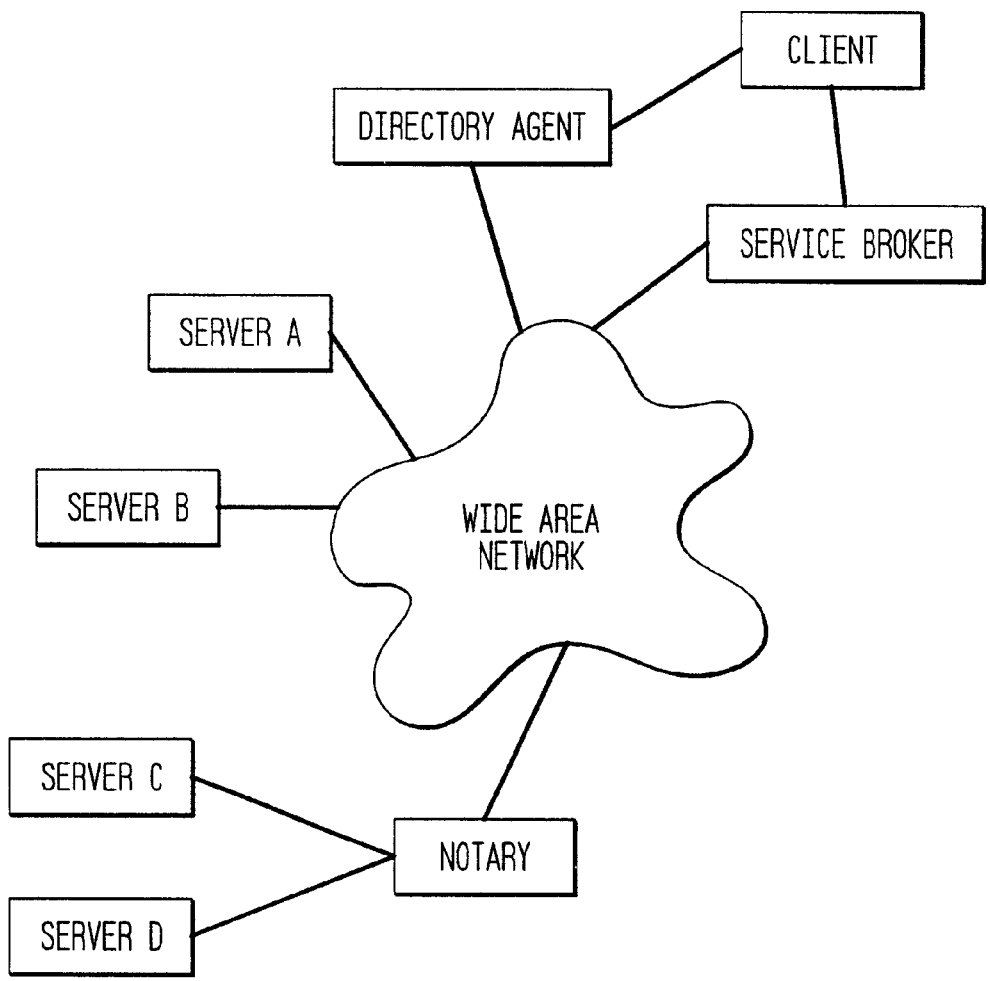
FIG. 1 is a diagram of the protocol architecture of the instant invention allowing clients in a data network to locate services in the wide area network.

The inventive architecture for the instant invention which fulfills these requirements is shown in FIG. 1. The various components of the architecture are defined as follows:

Referring first to the Servers A-D shown in FIG. 1, they advertise using network multicast in order to let clients use their services. To do so, they send messages into a multicast group, describing the attributes and cost structure of the services they provide.

For each service, a plurality of multicast addresses are defined. These are computed as a string hash of the service. Service Brokers (shown in FIG. 1) listen to this multicast address. In addition, any Server wishing to advertise this service also listens to this address. By listening to this address, a Server wishing to advertise on it can keep track of the number of other Servers also advertising.

When using multicast to distribute information about services, some kind of control must be exerted to limit the frequency of advertisements from a server. If the frequency were fixed, the total number of packets sent to the multicast group, and received at each broker (defined below), would grow linearly with the number of servers advertising. This can lead to congestion and poor performance. To deal with this, the frequency of the advertisements from a server is set to scale back based on a simple technique.

Any server which advertises to a multicast group G also joins and listens to the group. It counts the number of distinct other servers which send advertisements to the group. Let's say N other servers are heard from. The period of advertisements from the server is then set to N times some basic period Tb. This limits the total amount of bandwidth on a multicast group to roughly one packet every Tb seconds. This is independent of the number of servers advertising. The bandwidth usage thus scales well, at the expense of less frequent advertisements.

Some additional aspects of this basic "back-off" algorithm can also be used:

1. The period is always made greater than some minimum.

2. The minimum period increases with the age of the advertisement. The age is defined as the number of times the exact same advertisement has already been sent. When any parameter of the advertisement changes, the age is reset to zero. This allows older advertisements to be sent less frequently.

3. A random factor is added so that the actual period varies randomly between 1/2 and 3/2 of whatever the deterministic period, computed above, turns out to be. The random factor helps avoid some synchronization pathologies that can occur.

Let's say a Server hears N other servers. We define a parameter CONFIG_INTERVAL_12, which is the average worst-case interval of 1 kbyte packets to be transmitted, summed across all servers, into the multicast group. Each Server wishing to send an advertisement of size K will periodically send the advertisement with a period T equal to:

$$T=R(1/2)\max(\text{CONFIG\_INTERVAL\_13}*F(\text{age}),N*\text{CONFIG\_INTERVAL\_12}*K/1024),$$

where
F(age) is a function which starts at some fractional power of two, $2^{\wedge}(-\text{CONFIG\_INTERVAL\_14})$, whenever an advertisement is different from the previous. For each subsequent advertisement which is not different from the previous, F(age) doubles, until it hits 1, and then it stays fixed at 1. We also define R(1/2) as a random variable uniformly distributed between 1/2 and 3/2. For example, say that CONFIG_INTERVAL_12 is 64 ms. This means that the total rate of packets sent into the group will be 128 kbps when group sizes are large. If there are 1000 servers, each sending 1 kByte packets, each one will get to advertise once a minute. When group sizes are smaller, the packet rate remains at 1/CONFIG_INTERVAL_13 (perhaps 32 kbps) during steady state. However, when an advertisement changes, the rate can temporarily increase (but not above 128 kpbs) to hasten the broadcast of this announcement.

This mechanism allows for the number of Servers to grow without causing an increase in the bandwidth used on the multicast address. A similar mechanism is used in RTP to provide scalability, (described by J. Rosenberg and H. Schulzrrn e, in "Timer Reconsideration For Enhanced RTP Scalability", proceedings of the IEEE, Infocom '98. The advantage of this approach is to solve two of the limitations of the prior art. First, Servers do not need to know the actual addresses of Brokers. This eliminates the need for wide-area multicast searches and/or Broker advertisements (used in the Service Location Protocol). It also makes the system dynamic. As soon as a new Broker is turned on, it can immediately learn about new services, and this process is transparent to the servers providing the service (this is not the case for the web search engines, for example). It also solves the problems of excessive load on brokers. The rate is now finely controlled, independent of the number of Servers.

Servers that are not multicast capable, or which do not want to subscribe to the service advertisement multicast group for reasons of bandwidth or complexity may use Notary to diffuse their service advertisements as described below.

Turning now to a Service Broker (shown in FIG. 1), this element of the architecture accepts service requests and service type requests from clients. These requests ask for the location of a Server matching a set of criteria described by the client. The Broker answers with service replies and service type replies. A Broker generally handles service requests for one or several specific services; that is why it is called a Service Broker. This is required in order to scale the disk storage and processing requirements for Brokers. It is also desirable since different services may have different requirements for matching client requests. For example, the Internet telephony gateway service may often require searches for Servers which provide the cheapest cost for calling a specific destination Database searches can be organized for this kind of query, but only if the broker knows that it will receive mostly or only these type of service requests.

Like a Server, the Broker multicasts service announcements. If a Broker offers a service location for service X, then it will advertise itself as an offering service X-broker. For example, a Broker offering a media server broker service may use a URL:

service:mediaserver-broker://mymachine.mydomain.com:800

Brokers themselves can have various attributes which define the broker service they provide. For example, this might be a typical attribute specification for an Internet telephony gateway broker:

(NUMBER_GATEWAYS=1000),
(AUTHENTICATION=STRONG)

This would define this telephony gateway broker as having a database of around 1000 gateways. The authentication attribute indicates that this broker provides strong assurances of the correctness of the gateway attributes it stores.

Brokers can be additionally programmed to implement some kind of policy, local to the administrator of the Broker. This policy may restrict the set of Servers whose advertisements are kept by the particular Broker. For example, lets say a major ISP is running a broker service for telephony gateways for its customers. The ISP may decide that the Broker should reject all internet telephony gateway service advertisements from Servers run by a competing ISP. As another example, a Broker may have limited disk space, and may drop advertisements for Servers which it believes are unlikely to be used by any of its clients, based, say, on past history logs of service requests. It should be possible for any sort of policy to be implemented. However, Brokers should indicate the policy attributes in their service advertisement.

The use of Brokers for a particular service also adds more scalability. Requests requiring attribute minimization can be considerably more CPU intensive than simple look-ups. As the queries for a particular service increase, and begin to exceed the processing capabilities of a Broker, additional Brokers can be added to distribute the load. This load distribution can be implemented easily in the directory agent, to which Brokers are registered. The entire process becomes transparent to the clients and to the Servers.

The main limitation to scalability for the Brokers is the processing burden to search a large number of records. If the number of Servers for a particular service begins to exceed several tens of thousands, the storage requirements for them, and the time for even a single search of the database for a match, can become excessive. In this scenario, Brokers always have the option of implementing some kind of policy to restrict the size of the database. As faster machines and bigger disks become available, these policies can be lifted. Furthermore, such restrictions open up the possibility of market competition for broker service. If a Broker is willing to buy a big enough disk and fast enough machine to store and search every Server, that Broker can attract more customers to the broker service.

The use of Brokers allows a client to find out about any particular service, once it can find a Broker for that service. How does a client find a broker for a particular service? To accomplish this, a Directory Agent (FIG. 1) may be used. This device is like a Broker. It listens to a particular multicast address to find out services, and it answers client queries for the services it knows about. However, it knows only about a very specific set of services: Broker services. This device is contacted first by a client to find out a Broker for a particular service. Generally, the client must know about its Directory Agent. It can learn this information by DHCP, manual configuration, or via the service location protocol.

A client (FIG. 1), of course, is a system which wants to find the address of a Server which can provide some service desired by the client.

A Directory Agent can also function as a Broker and maintain a data base listing available services. In this instance, the Directory Agent would provide service information to a client without involving a Broker. Also, of course, it is possible that a Directory Agent could provide information available from a Broker directly to a client without identifying any particular Broker.

The final addition to the inventive architecture is a new device which we call a Notary. Its purpose is to lessen the burden of authentication which is placed on Brokers, or to support non-multicast multicast capable Servers. Instead of registering directly with all the Brokers by multicasting its advertisement, a Server will instead register with a Notary. It is the job of this Notary to provide some form of authentication for the servers which it represents. Once authenticated, the Notary acts as a proxy for those Servers, multicasting the advertisements for them. The form of the service advertisements is nearly identical to that of a Server. The exception is that all the authentication information in the message is used to authenticate the Notary, and is the same for all Servers being advertised from this Notary. This lessens the burden of authentication to that of a single Notary, instead of many Servers.

Due to political or technical problems regarding cryptographic technologies, a unified strong authentication mechanism may not be in place very soon. The use of Notaries allows the servers to authenticate themselves to the Notary by any local or proprietary scheme.

In general, for services that involve billing authentication of the Server may not be enough. The user may want some assurance about the trustworthiness of the remote service operator. Notary services could be provided by authorities of sufficient influence and reputation to be trusted by users. Such authorities may, for example, police misbehaving service providers they represent, using nonelectronic means (such as auditing financial records, etc.). This kind of model already exists; credit card companies will absorb the costs of fraudulent vendors, and revoke their capabilities to use the credit card to charge customers.

Another requirement is for clients to know, at least roughly, how distant a Server is. It is desirable for a client to include some kind of distance metric in a service request to a Broker.

To support this, Servers should include, in all service advertisements, an attribute called INITLIL_TTL. This attribute indicates the value of the TTL (Time to live) field used in the IP packet containing the advertisement. When a Broker hears this advertisement on the multicast address, it notes the TTL in the IP packet when it arrived, and the value of the INITIAL_TTL attribute. From this, a Broker can ascertain the number of hops from the server to itself. Similarly, when clients send a service request, they also include the INITIAL_TTL attribute in the request. When received at the Broker, this allows the Broker to know how distant the client is from itself.

In the service request, a client may optionally include the DISTANCE attribute, and specify any allowable value for it. A Broker can compute the attribute for each record, on a per client basis, it by some kind of combination of the server-to-broker and client-to-broker hop counts. The advantage of this scheme is that it does not require any sort of additional messages to compute distance metrics.

Figure 2:
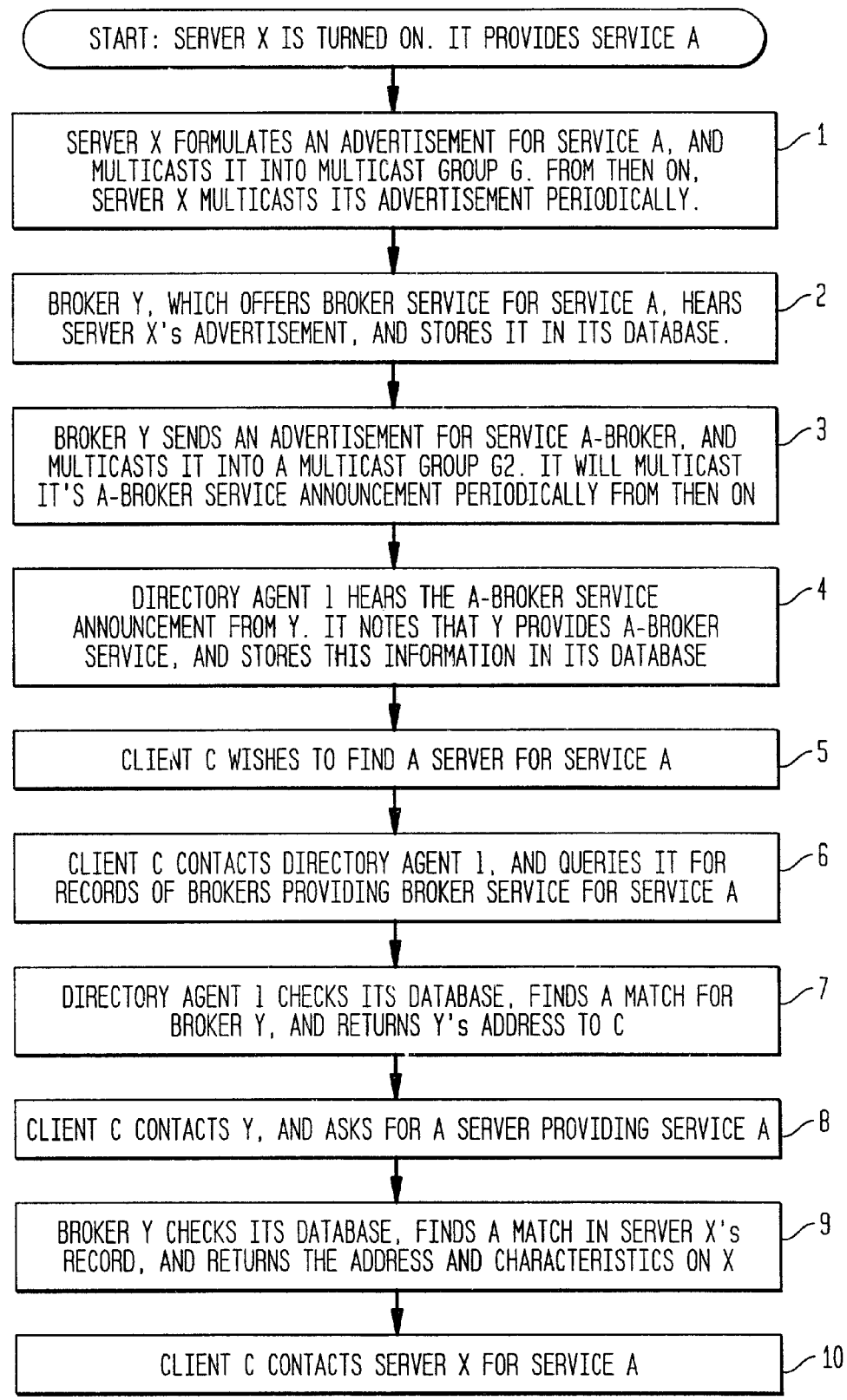
FIG. 2 describes the flow of events which occurs when the system protocol architecture is initialized.

The flow chart in FIG. 2 describes the flow of events which occurs when the system is initialized. It should be noted that since the protocol is executed by independent network entities, the temporal order of events may vary.

What has been described is the problem of location of services in the wide area Internet. The proposed new architecture for resolving these drawbacks: multicasting of registrations, service specific brokers, distance metrics and hierarchical authentication services via notaries, solves the problems present in prior art systems.

What is claimed is:

1. A method for locating services in a wide area network, comprising the steps of:

receiving a communication from a Server X desiring to provide a service A to a client connected to said wide area network;

Server X joining a multicast group G1 on said wide area network, wherein Server X listens to said multicast group G1 and counts the number of other distinct servers which are currently sending advertisements for service A to said multicast group G1;

Server X periodically multicasting an advertisement for service A, wherein a period between sending of subsequent advertisements from Server X is dependent on the number of other distinct servers which are currently sending advertisements for service A to said multicast group G1;

storing, in a Broker Y's database, the advertisement for service A multicast by Server X;

periodically multicasting from Broker Y an advertisement for service-A-Broker to multicast group G2;

processing a request from client C to Broker Y for a server providing service A; and providing from Broker Y to client C an address for Server X to obtain service A.

2. A method for locating services in a wide area network in accordance with claim 1, further including the steps of:

storing, in a Directory Agent Z's database, the advertisement multicast by Broker Y;

processing a communication from client C who is seeking a server for service A, and relaying said communication to Directory Agent Z;

initiating a database search by Directory Agent Z for providers of service-A-Broker;

locating Broker Y in response to said database search; and returning an address for Broker Y to client C.

3. A method for locating services in a wide area network in accordance with claim 2, wherein said locating step further includes the steps of:

querying Broker Y on behalf of client C, and returning an address for Server X, provided by Broker Y, directly to client C.

4. A method for locating services in a wide area network in accordance with claim 1, further including the steps of:

registering, with a Notary, an advertisement generated by a server;

providing, by the Notary, authentication for the servers it represents; and multicasting, by the Notary, the advertisements for the servers registered with the Notary.

5. A method for locating services in a wide area network, comprising the steps of:

defining a plurality of multicast addresses for services that can be provided in said wide area network;

Server X, desiring to provide a service A to a client connected to said wide area network, joining a multicast group G1 on said wide area network, wherein Server X listens to said multicast group G1 on the defined multicast address for service A and counts the number of other distinct servers which are currently sending advertisements for service A to said multicast group G1;

Server X periodically multicasting an advertisement for service A, wherein a period between sending of subsequent advertisements from Server X is dependent on the number of other distinct servers which are currently sending advertisements for service A to said multicast group G1;

storing, in a Broker Y's database, the advertisement for service A multicast by Server X;

Broker Y periodically multicasting service announcements of advertisements it has stored in its database;

receiving and processing a request from client C to Broker Y for a server providing service A; and providing from Broker Y to client C an address for Server X to obtain service A.

6. The method of claim 5, wherein the period between sending of subsequent advertisements from Server X further comprises:

said period is always greater than a pre-determined minimum period; and said pre-determined minimum period increases with the age of the advertisement.

7. The method of claim 5, further comprising:

adding a random factor so that the actual period between sending of subsequent advertisements varies randomly between ½ and 1½ times in length of the pre-determined minimum period.

8. The method of claim 5, further comprising:

Broker Y implementing at least one pre-determined policy to restrict which servers whose advertisements are kept in the Broker Y's database.

9. The method of claim 5, further comprising: Server X including in its service advertisements an attribute which indicates a value of the Time to live field used in the IP pockets containing the advertisement.

10. The method of claim 5, further comprising:

a client including a distance attribute in its service request to Broker Y, and specifying an allowable value for said distance attribute.

* * * * *